Jan. 15, 1929.

R. N. KIRCHER

INSET PAN FOR COOKERS

Filed April 13, 1927

1,698,914

INVENTOR.
RALPH N. KIRCHER,
BY
ATTORNEYS.

Patented Jan. 15, 1929.

1,698,914

UNITED STATES PATENT OFFICE.

RALPH N. KIRCHER, OF WEST BEND, WISCONSIN, ASSIGNOR TO WEST BEND ALUMINUM COMPANY, OF WEST BEND, WISCONSIN, A CORPORATION OF WISCONSIN.

INSET PAN FOR COOKERS.

Application filed April 13, 1927. Serial No. 183,545.

The invention relates to an improved construction of inset pan for use in connection with the American waterless cooker, whereby the said pan is freed from interference, and may be more readily removed from the cooker.

The invention also relates to other structural features of the said pan, whereby the steam generated in the lower compartment of the cooker may find easy movement around the inset pan and be collected and condensed by the cover sealing the cooker, the condensation then returning to the lower compartment to augment the degree of moisture.

Heretofore, such inset pans have been provided with a plain supporting roll or ring projecting outwardly at their upper edges, and designed to rest upon the circular seat for the cover formed at the top of the cooking vessel. Such pans of the older form have been provided with wire bails, adapted to be folded into the inset pan, and by which bails the pan could be withdrawn from the cooker. The presence of such bails has constituted an obstruction heretofore, and has interfered with the cleansing and polishing of the inset pan after use. My present invention dispenses with the use of such bails, and substitutes therefor a simple arrangement which facilitates the removal of the inset pan and its contents from the cooker, conducing greatly to the convenient handling of the inset pan.

The results described are achieved by diverting or offsetting parts of the roll or ring at the top of the inset pan from its usual horizontal plane so as to lie thereover, and forming openings in the walls of the pan in connection with the raised portions of the roll or ring for easy insertion therethrough of two common forks, so as to permit lifting of the pan. Other raised portions of the said roll or ring permit the movement of the saturated steam and its condensation, as before referred to.

The specific construction embodied in my invention will now be described, and the novelty thereof will be pointed out in the appended claims.

Figure 1:
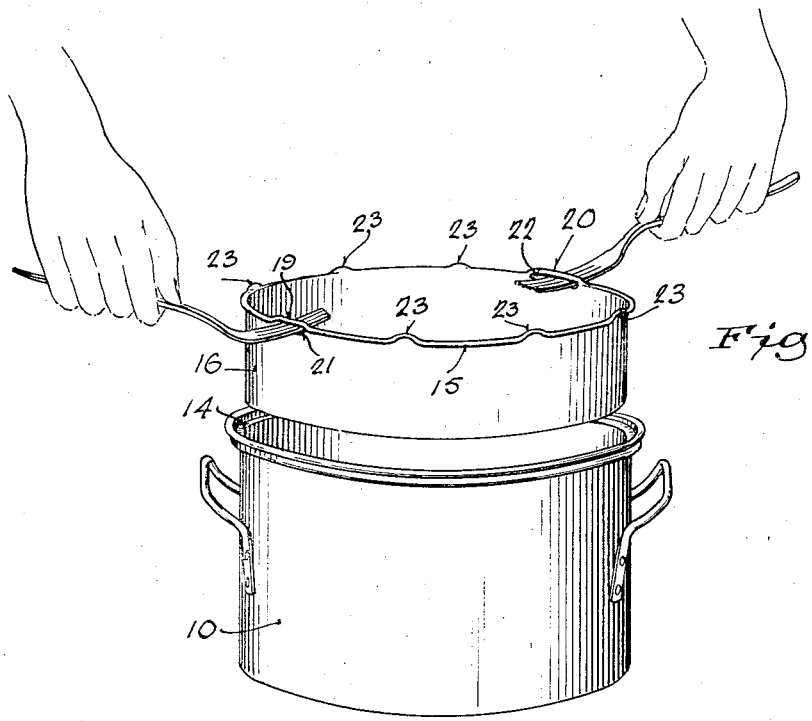
Figure 1 is a perspective view of the food container of an American cooker, showing the easy manner in which the inset pan is removed therefrom.
Figure 2:
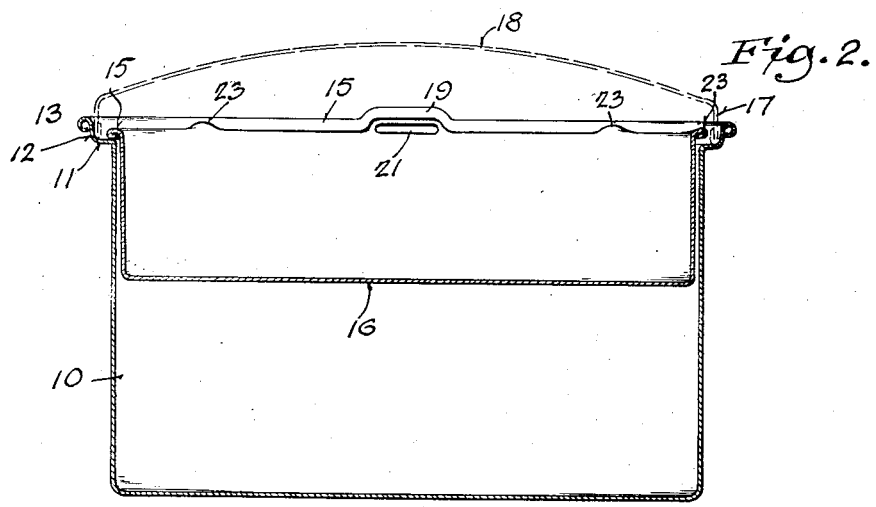
Fig. 2 is a vertical central sectional view of the said container with the inset pan positioned therein, and showing in dotted lines a conventional cover for the cooker positioned as in use.

In the drawing, the numeral 10 indicates the container of the cooker, provided at its top with a radial flange 11, which is upturned as at 12, and finished with a roll 13, the flange 11 forming a circular step 14 upon which is seated the roll or ring 15 at the top of the inset pan 16, the latter by such means being positioned and supported in the cooker. The relative diameters of the container 10 and of the inset pan 16 are such that there is little or no lateral movement of the inset pan with relation to the container. This limitation prevents any encroachment upon the space provided between the roll or ring 15 and the upturned part 12 of the flange 11, thus insuring the entry of the downturned flange 17 of the cover 18 into the said space, so that such cover may be seated upon the step 14.

At opposite points in the diameters of the inset pan, the roll or ring 15 is offset from its horizontal plane so as to form raised portions 19 and 20, the vertical walls of the pan adjacent such raised portions and in the horizontal plane of the roll or ring 15 being provided with elongated perforations 21 and 22. Such perforations lie in or a little above the plane of the step 14, and are so positioned that two ordinary table forks may be inserted oppositely, and the inset pan easily lifted and removed from the container 10, following the removal of the cover 18 from the container or vessel 10.

At spaced points in the circumference of the roll or ring 15 of the inset pan, such roll or ring is offset from its horizontal plane, in the manner indicated severally by the numeral 23, so as to provide outlets through which the steam generated in the cooking of the articles in the lower part of the container or vessel 10, may be passed around the inset pan and be collected and condensed by the cover 18. The condensation flows down the inside of the cover, over the step 14, through the several openings formed by the displacement of the roll or ring, and returns to the bottom compartment of the cooker, to replenish the moisture.

Having thus described my invention, what I claim and desire to secure by Letters Patent of the United States, is:

1. In a cooking utensil, a vessel or container having a seat, an inset pan for the container provided with means whereby the pan is supported upon the seat, and having means formed solely in conjunction with the supporting means for the inset pan whereby the said pan may be removed from the container.

2. In a cooking utensil, a vessel or container provided with a seat, an inset pan provided with means engaging the said seat for supporting the said pan, and means as opposite perforations in the wall of the pan and associated with the supporting means for the inset pan to enable the said pan to be lifted and removed from the vessel or container.

3. In a cooking utensil, a vessel or container provided with a seat, an inset pan provided with a roll or ring engaging the said seat to support the pan in the container, portions of the said roll or ring being displaced from the plane thereof and the wall of the pan perforated at such displacement to form means for lifting the inset pan and removing it from the vessel or container.

4. In a cooking utensil, a vessel or container provided at its top with a radial flange forming a seat, an inset pan having at its top a roll or ring engaging the said seat to support the pan within the container, opposite portions of the said roll or ring being displaced from the horizontal plane thereof, with perforations under such displaced portions to provide means for lifting and removing the pan from the vessel or container.

5. In a cooking utensil, a vessel or container provided with a seat at its upper end, an inset pan provided with a roll or ring engaging the said seat and supporting the pan within the vessel or container, the said ring being displaced at points from its horizontal plane to form openings through which steam may pass from the vessel or container and to the inset pan, and a cover for the vessel or container to condense the steam.

6. An inset pan for a cooking utensil, the said pan being provided at its top with a circular roll or ring extending in a horizontal plane, and forming a support for the pan, the said roll or ring being displaced from its horizontal plane at points to provide means for lifting the pan.

7. An inset pan for a cooking utensil, the said pan being provided at its top with a circular roll or ring extending in a horizontal plane, and forming a support for the pan, the said roll or ring being displaced from its horizontal plane at points to provide means for lifting the pan, and at other points to provide passages for steam between the said ring and its support.

In testimony whereof, I have signed my name at West Bend, Wisconsin, this 8th day of April, 1927.

RALPH N. KIRCHER